US006660962B2

United States Patent
McCay et al.

(10) Patent No.: US 6,660,962 B2
(45) Date of Patent: Dec. 9, 2003

(54) METHOD FOR GAS ASSISTED ENERGY BEAM ENGRAVING OF A TARGET OBJECT

(75) Inventors: Mary Helen McCay, Monteagle, TN (US); C. Michael Sharp, Belvidere, TN (US); John Brice Bible, South Pittsburg, TN (US); John A. Hopkins, Tullahoma, TN (US); T. Dwayne McCay, Monteagle, TN (US); Narendra Dahotre, Tullahoma, TN (US); Frederick A. Schwartz, Woodbury, TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 10/208,227

(22) Filed: Jul. 30, 2002

(65) Prior Publication Data

US 2002/0190036 A1 Dec. 19, 2002

Related U.S. Application Data

(63) Continuation of application No. 09/873,722, filed on Jun. 4, 2001, now abandoned, which is a continuation of application No. 09/413,972, filed on Oct. 7, 1999, now abandoned.

(51) Int. Cl.$^7$ .............................................. B23K 26/00
(52) U.S. Cl. ............................. 219/121.69; 219/121.85
(58) Field of Search ....................... 219/121.69, 121.68, 219/121.67, 121.85

(56) References Cited

U.S. PATENT DOCUMENTS

| | | | | | |
|---|---|---|---|---|---|
| 3,636,251 | A | * | 1/1972 | Daly et al. ................ | 178/6.6 B |
| 4,480,169 | A | * | 10/1984 | Macken ................... | 219/121 H |
| 4,801,352 | A | * | 1/1989 | Piwczyk ....................... | 156/643 |
| 5,308,431 | A | * | 5/1994 | Maher et al. ................ | 156/345 |
| 5,322,436 | A | * | 6/1994 | Horng et al. .................. | 433/23 |
| 5,563,095 | A | * | 10/1996 | Frey ............................ | 437/141 |
| 5,614,114 | A | * | 3/1997 | Owen ..................... | 219/121.66 |
| 5,643,641 | A | * | 7/1997 | Turchan et al. ............. | 427/595 |
| 5,874,011 | A | * | 2/1999 | Ehrlich ......................... | 216/65 |

* cited by examiner

Primary Examiner—M. Alexandra Elve
(74) Attorney, Agent, or Firm—Duane Morris LLP

(57) ABSTRACT

This invention relates to a method for gas assisted energy beam engraving of a target object. This invention employs and energy beam, such as a laser beam or an electron beam, to irradiate a target object in the presence of a selected gaseous environment in order to engrave a mark in the object.

18 Claims, 4 Drawing Sheets

10 — PLACING A TARGET OBJECT IN A CONTROLLED GASEOUS ENVIRONMENT;

12 — IRRADIATING THE TARGET OBJECT WITH AN ENERGY BEAM AT A SUFFICIENT POWER LEVEL AND BEAM SIZE TO ENGRAVE A MARK IN THE TARGET OBJECT, WHILE THE PORTION OF THE OBJECT BEING IRRADIATED IS PRESENT IN THE CONTROLLED GASEOUS ENVIRONMENT; AND

14 — CAUSING RELATIVE MOVEMENT AT A PRESELECTED SPEED BETWEEN THE ENERGY BEAM AND THE TARGET OBJECT DURING THE IRRADIATION.

10 | PLACING A TARGET OBJECT IN A CONTROLLED GASEOUS ENVIRONMENT;

12 | IRRADIATING THE TARGET OBJECT WITH AN ENERGY BEAM AT A SUFFICIENT POWER LEVEL AND BEAM SIZE TO ENGRAVE A MARK IN THE TARGET OBJECT, WHILE THE PORTION OF THE OBJECT BEING IRRADIATED IS PRESENT IN THE CONTROLLED GASEOUS ENVIRONMENT; AND

14 | CAUSING RELATIVE MOVEMENT AT A PRESELECTED SPEED BETWEEN THE ENERGY BEAM AND THE TARGET OBJECT DURING THE IRRADIATION.

Figure 1

20 | IRRADIATING A TARGET OBJECT WITH A LASER BEAM AT A SUFFICIENT POWER LEVEL AND BEAM SIZE TO ENGRAVE A MARK IN THE TARGET OBJECT;

↓

22 | SIMULTANEOUSLY WITH THE IRRADIATING, COVERING THE SURFACE OF THE TARGET OBJECT WHICH IS BEING IRRADIATED WITH A SELECTED COVER GAS; AND

↓

24 | SIMULTANEOUSLY WITH THE IRRADIATING, CAUSING RELATIVE MOVEMENT AT A PRESELECTED SPEED BETWEEN THE LASER BEAM AND THE TARGET OBJECT, SUCH THAT THE ENGRAVED MARK IS A PRESELECTED PATTERN.

Figure 2

30 | EMITTING A LASER BEAM FROM A LASER AT A SUFFICIENT POWER LEVEL AND BEAM SIZE TO ENGRAVE A TARGET OBJECT;

32 | MOVING THE LASER IN A PRESELECTED PATTERN TO PRODUCE A PRESELECTED MARK ON THE TARGET OBJECT; AND

34 | SIMULTANEOUSLY WITH THE EMITTING AND MOVING, COVERING THE SURFACE OF THE TARGET OBJECT WHICH IS BEING IRRADIATED WITH A SELECTED COVER GAS.

Figure 3

| 36 | EMITTING A COVER GAS FROM A NOZZLE; AND |

| 38 | MOVING THE NOZZLE SUCH THAT THE COVER GAS IS DIRECTED AT THE REGION OF THE TARGET OBJECT BEING IRRADIATED. |

METHOD FOR GAS ASSISTED ENERGY BEAM ENGRAVING OF A TARGET OBJECT

REFERENCE TO RELATED APPLICATIONS

This application is a continuation of application of Ser. No. 09/873,722, filed on Jun. 4, 2001, abandoned which is a continuation application of Ser. No. 09/413,972, filed on Oct. 7, 1999 abandoned.

BACKGROUND OF THE INVENTION

1. Field of the Invention

This invention relates to a method for gas assisted energy beam engraving of a target object. This invention employs an energy beam, such as a laser beam or an electron beam, to irradiate a target object in the presence of a selected gaseous environment in order to engrave a mark in said object.

2. Description of the Prior Art

Laser beams have been employed to engrave marks on the surface of target objects. Prior art methods of laser engraving have been carried out in the ambient atmospheric environment.

Ambient environment laser engraving results in a limited degree of contrast between the engraved mark and the background on which it is placed, the speed with which the mark can be applied, and the number of different materials which can be marked.

The present invention provides an improved method for energy beam engraving, in which an energy beam, such as a laser beam, is used to engrave a target object in the presence of a selected gaseous environment. This improved method provides enhanced contrast, increased readability, increased marking speeds, and an increased number of materials which can be marked by the energy beam.

SUMMARY OF THE INVENTION

The present invention is directed toward a method of gas assisted energy beam engraving of a target object. This invention comprises placing a target object in a controlled gaseous environment, irradiating the target object with an energy beam at a sufficient power level and beam size to engrave a mark in the target object, while the portion of the object being irradiated is present in the controlled gaseous environment. This method further comprises causing relative movement at a preselected speed between the energy beam and the target object during irradiation.

DESCRIPTION OF THE DRAWINGS

FIG. 1 is a block diagram of a first embodiment of the present invention.

FIG. 2 is a block diagram of a second embodiment of the present invention.

FIG. 3 is a block diagram of a third embodiment of the present invention.

DESCRIPTION OF THE PREFERRED EMBODIMENTS

Figure 5:
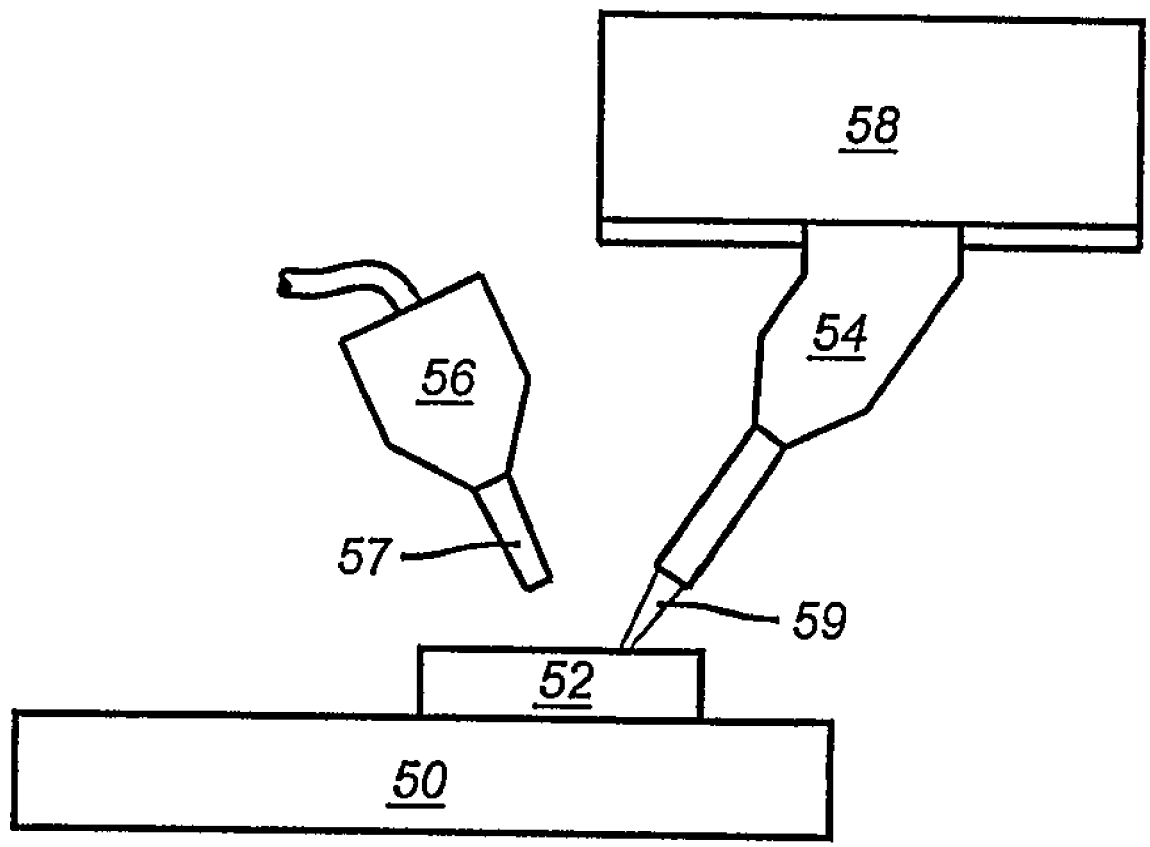

FIG. 5 is a side view of an apparatus embodiment of the present invention.

In a first embodiment, the present invention comprises placing a target object on a target holder 50 controlled gaseous environment, as shown in block 10 of FIG. 1. In preferred embodiments, the gaseous environment comprises argon, nitrogen, oxygen, or carbon dioxide.

The invention further comprises irradiating the target object 52 with an energy beam 59 at a sufficient power level and beam size to engrave a mark in the target object while the portion of the object being irradiated is present in the controlled gaseous environment, as shown in block 12 of FIG. 1 and in FIG. 5. In a preferred embodiment, the target object comprises stainless steel, aluminum, or titanium. In another preferred embodiment, the target object is a ceramic.

In one preferred embodiment, the energy beam is a laser beam. In a preferred embodiment, the laser is emitted from a Model LD-100 Desktop Laser Marker, available from Laser Marking Technologies, LLC of Lafayette, Colo. In this embodiment, the laser beam is emitted at a current level of six to ten amperes. In another preferred embodiment, the laser is emitted at a current level of at least six amperes. In another preferred embodiment, the energy beam is ap electron beam.

A second embodiment of the present invention is directed toward a method for gas assisted laser engraving of a target object. This embodiment comprises irradiating a target object with a laser beam at a sufficient power level and beam size to engrave a mark in the target object, as shown in block 20 of FIG. 2. This method further comprises covering the surface of the target object which is being irradiated with a selected cover gas, simultaneously while the irradiation is taking place, as shown in block 22 of FIG. 2. The term "cover gas," as used herein, refers to any reducing gas, inert gas, or oxidizing gas. Oxidizing gases facilitate oxidation reactions. Reducing gases facilitate reduction reactions.

In a preferred embodiment, the cover gas is ejected from a nozzle 57 attached to a source of cover gas 56, as shown in FIG. 5. In another preferred embodiment, the cover gas is heavier than the gas composition which makes up the earth's atmosphere.

This method further comprises causing relative movement at a preselected speed between the laser beam and the target object, such that the engraved mark is a preselected pattern. This relative movement occurs simultaneously with the irradiation, as shown in block 24 of FIG. 2. This relative movement may take place by moving the laser in incremental steps, each step being no greater than 60 microns in size.

In a preferred embodiment, the relative movement comprises moving a laser which emits the laser beam using movement system 58 as shown in FIG. 5. As further shown in FIG. 5, the laser is emitted from an energy beam device 54 which is positioned to direct an energy beam along a direct path at a predetermined portion of the target object. In a preferred embodiment using the Model LD 100 Desktop Laser Marker, the laser is moved at a speed of up to three meters per second. The appropriate speed will be a function of the target composition and the desire depth of engraving. In another preferred embodiment, causing relative mivement comprises moving the target object.

A third embodiment of the present invention is depicted in FIG. 3. This embodiment comprises emitting a laser beam from a laser at a sufficient power level and beam size to engrave a target object, as shown in block 30 of FIG. 3. This method further comprises moving the laser in a preselected pattern to produce a preselected mark on the target object, as shown in block 32 of FIG. 3.

This embodiment of the invention further comprises covering the surface of the target object which is being irradiated with a selected cover gas, as shown in block 34 of FIG.

3. This step is carried out simultaneously with the steps shown in blocks 30 and 32 of FIG. 3.

Figure 4:
FIG. 4 is a block diagram of a preferred embodiment of covering a target with a covering gas, using the method of the present invention.

In a preferred embodiment, the covering comprises emitting the cover gas from a nozzle, as shown in block 36 of FIG. 4. The covering further comprises moving the nozzle such that the cover gas is directed at the regions of the target object being irradiated, as shown in block 38 of FIG. 4.

In a preferred embodiment, the cover gas comprises one or more gases selected from the group consisting of argon, nitrogen, oxygen, and carbon dioxide.

The foregoing disclosure and description of the invention are illustrative and explanatory. Various changes in the size, shape, and materials, as well as in the details of the illustrative embodiments may be made without departing from the spirit of the invention.

What is claimed is:

1. A method for gas assisted energy beam engraving of a target object, comprising:
   a. placing at least a portion of the target object in a controlled gaseous environment;
   b. energizing a source of an energy beam with at least six amperes of current, the energy beam further comprising a beam size sufficient to engrave a mark in the target object to predetermined dimensions;
   c. irradiating a desired portion of the target object with the energy beam by transmitting the energy beam from its source alone a direct path to the target, while the desired portion of the target object being irradiated is present in the controlled gaseous environment; and
   d. causing relative movement between the energy beam and the target object during the irradiating, the movement occurring in a predetermined manner to create a desired engraved pattern in the target object.

2. The method of claim 1, wherein the gaseous environment comprises reducing gases, inert gases, oxidizing gases, or combinations thereof.

3. The method of claim 1, wherein the energy beam is a laser beam.

4. The method of claim 1, wherein the target object comprises ceramics, stainless steel, aluminum, ant titanium.

5. A method for gas assisted laser engraving of a target object, comprising:
   a. placing at least a portion of the target object into a controlled gaseous environment;
   b. irradiating at least a portion of the target object in the controlled gaseous environment with a laser beam from a laser, the laser drawing a current level of at least six amperes, the laser beam further comprising sufficient power and beam dimensions to engrave a desired mark in the target object;
   c. simultaneously with the irradiating, covering a surface of the target object which is being irradiated with a predetermined cover gas; and
   d. simultaneously with the irradiating, causing relative movement between the laser beam and the target object, at a preselected speed to create a desired pattern.

6. The method of claim 5, wherein the cover gas in step (c) is ejected from a nozzle in communication with a source of cover gas and the controlled gaseous environment.

7. The method of claim 6, further comprising moving the nozzle such that the cover gas is directed at the surface of the target object being irradiated.

8. The method of claim 5, wherein the cover gas is heavier than the gas composition which makes up the earth's atmosphere.

9. The method of claim 5, wherein step (d) further comprises moving a laser which emits the laser beam.

10. The method of claim 5, wherein step (d) further comprises moving the target object.

11. The method of claim 5, wherein the cover gas comprises gases selected from the group of gasses consisting of argon, nitrogen, oxygen, carbon dioxide, or combinations thereof.

12. The method of claim 5, wherein the target object comprises metallic objects and ceramic objects.

13. A system for engraving, comprising:
   a. a target holder disposed within the controlled gaseous environment, the target holder having sufficient size to support a target object to be engraved in the controlled gaseous environment;
   b. an energy beam device drawing at least six amperes, the energy beam device adapted to generate an energy beam of predetermined dimensions and said device is positioned to direct an energy beam along a direct path at a predetermined portion of the target object;
   c. a source of cover gas adapted to cover the portion of the target object being irradiated with the cover gas; and
   d. a movement system adapted to cause relative movement between said target object and said energy beam such that a desired engraved pattern may be produced in said target object.

14. The system of claim 13 wherein the movement system is coupled to the energy beam device.

15. The system of claim 14 wherein the movement system is adapted to cause movement in incremental steps of approximately 60 microns.

16. The system of claim 13 wherein the energy beam device is a laser.

17. The system of claim 13 wherein the source of cover gas comprises a nozzle directed at regions of the target object being irradiated.

18. The system of claim 13, wherein the cover gas comprises gases selected from the group consisting of argon, nitrogen, oxygen, carbon dioxide, and combination thereof.

* * * * *

UNITED STATES PATENT AND TRADEMARK OFFICE
CERTIFICATE OF CORRECTION

PATENT NO.       : 6,660,962 B2
APPLICATION NO.  : 10/208227
DATED            : December 9, 2003
INVENTOR(S)      : Mary Helen McCay et al.

It is certified that error appears in the above-identified patent and that said Letters Patent is hereby corrected as shown below:

Please add the following Figure 5: As shown in attached

Signed and Sealed this

Seventh Day of August, 2007

JON W. DUDAS
*Director of the United States Patent and Trademark Office*